US012699241B2

(12) United States Patent
Hwang

(10) Patent No.: US 12,699,241 B2
(45) Date of Patent: Aug. 4, 2026

(54) HIGH-POWER LASER BEAM TRANSMITTER INCLUDING DEPOLARIZER

(71) Applicant: HILLAB INC., Pohang-si (KR)

(72) Inventor: Seung Jin Hwang, Pohang-si (KR)

(73) Assignee: HILLAB INC., Pohang-si (KR)

( * ) Notice: Subject to any disclaimer, the term of this patent is extended or adjusted under 35 U.S.C. 154(b) by 265 days.

(21) Appl. No.: 18/562,118

(22) PCT Filed: Dec. 20, 2021

(86) PCT No.: PCT/KR2021/019444
§ 371 (c)(1),
(2) Date: Nov. 17, 2023

(87) PCT Pub. No.: WO2023/027265
PCT Pub. Date: Mar. 2, 2023

(65) Prior Publication Data
US 2024/0231024 A1 Jul. 11, 2024

(30) Foreign Application Priority Data

Aug. 26, 2021 (KR) ........................ 10-2021-0112844

(51) Int. Cl.
*G02B 6/42* (2006.01)
(52) U.S. Cl.
CPC ......... *G02B 6/4296* (2013.01); *G02B 6/4206* (2013.01); *G02B 6/4213* (2013.01)
(58) Field of Classification Search
None
See application file for complete search history.

(56) References Cited

U.S. PATENT DOCUMENTS

| | | | |
|---|---|---|---|
| 2005/0083568 A1* | 4/2005 | Nakae | H01S 5/2231 |
| | | | 359/341.3 |
| 2005/0096641 A1* | 5/2005 | Mizuno | A61F 9/008 |
| | | | 606/11 |
| 2012/0062848 A1* | 3/2012 | Koyanagi | G02B 27/286 |
| | | | 353/20 |
| 2018/0233878 A1* | 8/2018 | Leonardo | H01S 3/302 |
| 2020/0209640 A1* | 7/2020 | Oulianov | G02B 27/286 |

FOREIGN PATENT DOCUMENTS

| | | |
|---|---|---|
| KR | 10-1106797 B1 | 1/2012 |
| KR | 10-2020-0072467 A | 6/2020 |
| KR | 10-2153510 B1 | 9/2020 |
| KR | 10-2021-0016218 A | 2/2021 |

* cited by examiner

*Primary Examiner* — Shan Liu
(74) *Attorney, Agent, or Firm* — Bridgeway IP Law Group, PLLC; Sang Ho Lee; Hyun Woo Shin

(57) ABSTRACT

Provided is a high-power laser beam transmitter including a depolarizer. The present invention includes a high-power laser generator that generates a high-power laser beam, a beam transmitter that delivers, to an optical fiber, the laser beam emitted from the high-power laser generator, and the optical fiber disposed at the output end of the beam transmitter to receive the laser beam, wherein the beam transmitter includes a plurality of lenses and a depolarizer including a plurality of depolarizers respectively disposed between the plurality of lenses. By disposing the depolarizer and thus reducing the constructive interference occurring when the high-power laser beam is incident on the optical fiber, damage to the optical fiber due to high instantaneous output may be attenuated.

4 Claims, 7 Drawing Sheets

(a)

(b)

(a)

(b)

HIGH-POWER LASER BEAM TRANSMITTER INCLUDING DEPOLARIZER

TECHNICAL FIELD

The present disclosure relates to a high-power laser beam transmitter including a depolarizer, and particularly, to a high-power laser beam transmitter including a depolarizer in a beam depolarizer to attenuate damage to an optical fiber that is generated when a high-power laser beam is transmitted to the optical fiber.

BACKGROUND ART

High-power laser beam transmitters that generate high-energy laser beams are used a lot in various fields, so researches are being actively conducted. In particular, when a high-energy laser beam is transmitted to an optical fiber, the problem that the optical fiber is easily damaged due to high instantaneous output is generated. Damage to an optical fiber is usually generated by high instantaneous output on an incident surface and an exit surface, which is a main cause that reduces transmission efficiency together with Fresnel reflection.

For example, when energy of 1 J is transmitted to an optical fiber, power of 1 W for 1 second is enough for a continuous wave (CW) laser, but when the energy is transmitted for 1 second through 10 laser pulses having a pulse width of 10 ns, 0.1 J per pulse, power of 10 MW passes instantaneously 10 times through the optical fiber, so the optical fiber may be damaged.

The damage limit of silica-based optical fibers has been generally known as power density of 1 $GW/cm^2$. Since the diameter of common large-diameter optical fibers is 1 mm, about 10 MW becomes 1 $GW/cm^2$ or more in average on an optical fiber surface in accordance with unit conversion, so transmission is impossible and about 0.08 J per pulse may be a limit. This calculation is established only under the assumption that a laser beam is uniform and constructive interference of the laser beam does not occur, so, actually, a laser having lower energy per pulse should be used or the diameter of an optical fiber should be increased.

Accordingly, there is a need for a method of preventing damage to an optical fiber by attenuating constructive interference when transmitting a laser beam to the optical fiber in a high-power laser beam transmitter.

FIG. 1 is a conceptual diagram of a high-power laser beam transmitter including a beam homogenizer of the related art. Referring to FIG. 1, when an existing beam homogenizer that transmits a uniform laser beam to an optical fiber is used, constructive interference is generated by the beam homogenizer, so there is a problem that damage is generated probabilistically even within a damage limit. That is, a fine pattern is generated due to constructive interference.

When mediums are changed while light is transmitted, the reflectivity may be changed in accordance with the difference in refractive index between the mediums. When a laser is transmitted to an optical fiber in the air, a large amount of energy loses on an incident surface and an exit surface due to the difference in refractive index between mediums. For example, assuming that the refractive index of air is 1.00, the refractive index of a silica optical fiber is 1.46, and there is only a vertical incident angle, the following reflectivity formula is applied.

$$R = \left| \frac{n_1 - n_2}{n_1 + n_2} \right|^2 = \left| \frac{1.46 - 1.00}{1.46 + 1.00} \right|^2 \approx 3.6\%$$

That is, the transmissivity is 96.4% because the reflectivity is 3.6%, and when these terms are applied to an incident surface and an exit surface, the transmission efficiency of a single optical fiber is 92.9%.

A method of applying polishing and coating on two surfaces of an optical fiber is generally used to solve this problem, but there are problems that this method costs high, the possibility of damage to a coating surface in the process of transmitting high-power energy is high, and there is no method that can immediately cope with damage at the industrial sites when damage is generated. In particular, for an exit surface, there is a problem that the properties of a laser beam may change, depending on the polished state.

As a related art, a depolarizer configuration has been disclosed in Korean Patent No. 10-1106797 (Laser system of using direct locking method on coherent beam combining) to use a direct locking method when performing coherent beam combining, but this document discloses only a technology of synchronizing phases by polarizing and combining some beams. Further, there is Korean Patent No. 10-215351 (Beam homogenizer and a high-energy laser optical fiber beam transmission system using same), but this document discloses only a technology of transmitting a pulse laser having higher energy than a high-power laser pulse beam through an optical fiber.

DISCLOSURE

Technical Problem

An objective of the present disclosure is to provide a high-power laser beam transmitter including a depolarizer to prevent damage to an optical fiber due to constructive interference that is generated when a high-power laser beam is transmitted to the optical fiber.

Technical Solution

The present disclosure relates to a high-power laser beam transmitter including a depolarizer, the high-power laser beam transmitter including: a high-power laser generator generating a high-power laser beam: a beam transmission unit transmitting a laser beam emitted from the high-power laser generator to an optical fiber; and the optical fiber disposed at an output end of the beam transmission unit and receiving a laser beam, wherein the beam transmission unit is composed of several lenses and several depolarizers respectively disposed between the several lenses.

The several lenses are composed of a first lens to a fourth lens, and the several depolarizers are composed of a first depolarizer and a second depolarizer, in which the first depolarizer is disposed between the first lens and the second lens, and the second depolarizer is disposed between the second lens and the third lens.

The several depolarizers have the same shape and the same width and height, a side receiving a laser beam of the first lens is a concave surface and the other side thereof is flat surface, a side receiving a laser beam of the second lens is a flat surface and the other side thereof is a convex surface, and the third lens is composed of several lens cell arrays. An angle difference of exit patterns of the several depolarizers is generated in accordance with the number of the depolarizers that are disposed.

Advantageous Effects

According to the present disclosure, constructive interference that is generated when a high-power laser beam is incident on an optical fiber is reduced by disposing depolarizers, whereby it is possible to reduce damage to an optical fiber due to high instantaneous output.

Further, since an interference effect decreases, the number of peaks of a laser beam that are locally generated decreases and the size also decreases, so the damage limit of an optical fiber increases and the possibility of damage decreases.

MODE FOR INVENTION

Figure 1:
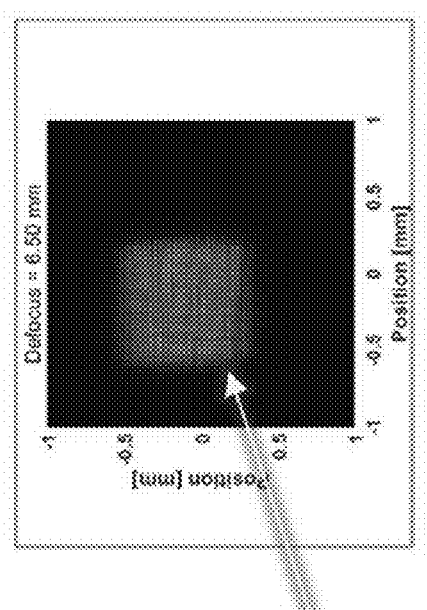
FIG. 1 is a conceptual diagram of a high-power laser beam transmitter including a beam homogenizer of the related art.
Figure 1:
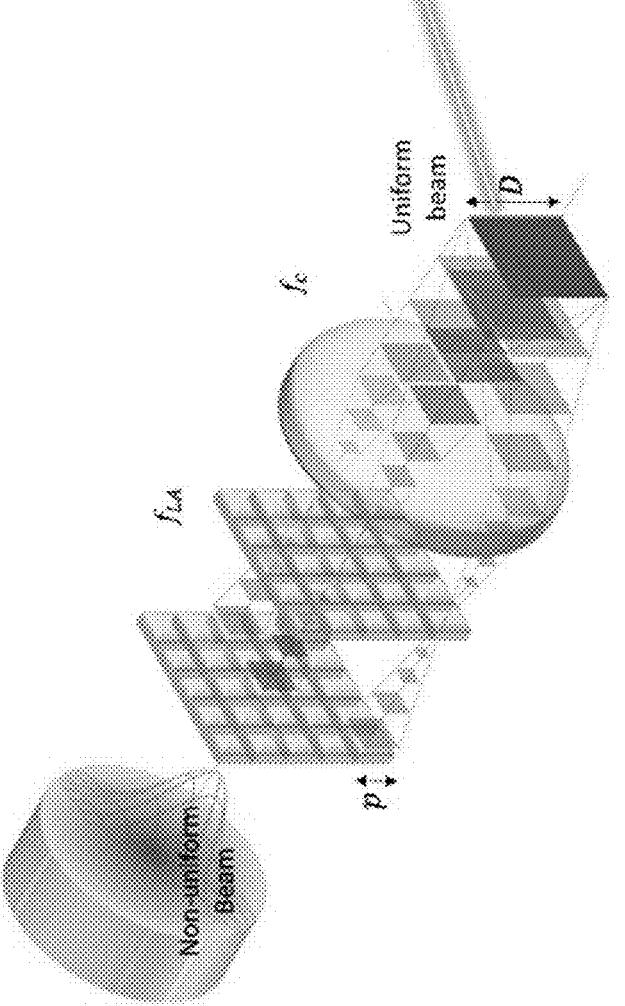

Specific structural and functional description about embodiments according to the concept of the present disclosure disclosed herein is exemplified only to describe the embodiments according to the concept of the present disclosure and the embodiments according to the concept of the present disclosure may be implemented in various ways and are not limited to the embodiments described herein.

Embodiments described herein may be changed in various ways and various shapes, so specific embodiments are shown in the drawings and will be described in detail in this specification. However, it should be understood that the exemplary embodiments according to the concept of the present disclosure are not limited to the specific examples, but all of modifications, equivalents, and substitutions are included in the scope and spirit of the present disclosure.

Terms used in the specification are used only in order to describe specific exemplary embodiments rather than limiting the present disclosure. Singular forms are intended to include plural forms unless the context clearly indicates otherwise. It will be further understood that the terms "comprise" or "have" used in this specification specify the presence of stated features, numbers, steps, operations, components, parts, or a combination thereof, but do not preclude the presence or addition of one or more other features, numerals, steps, operations, components, parts, or a combination thereof.

Hereinafter, various embodiments of the present disclosure will be described in detail with reference to the accompanying drawings.

Figure 2:
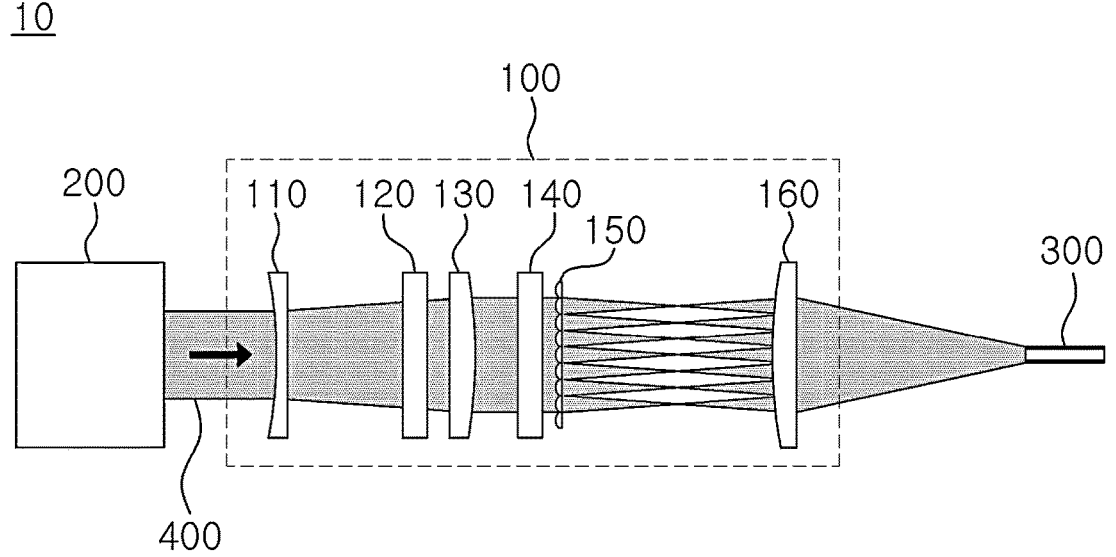
FIG. 2 is a configuration diagram of a high-power laser beam transmitter according to an embodiment of the present disclosure.

FIG. 2 is a configuration diagram of a high-power laser beam transmitter according to an embodiment of the present disclosure.

Referring to FIG. 2, a high-power laser beam transmitter 10 is composed of a beam transmission unit 100, a high-power laser generator 200, and an optical fiber 300.

The beam transmission unit 100 transmits a laser beam 400 emitted from the high-power laser generator 200 to the optical fiber. The beam transmission unit 100 is composed of several lenses and several depolarizers respectively disposed between the several lenses.

The several lenses may have different shapes and different widths and heights and may be configured in a lens array. The several depolarizers may have the same shape and the same width and height. However, the shape, width, and height of the lenses and the depolarizers are not limited.

The high-power laser generator 200 generates and transmits a high-power laser beam 400 to the beam transmission unit 100. The high-power laser generator 200 is disposed at an input end 100 of the beam transmission unit. A laser beam that is generated from the high-power laser generator 200 may have high energy within the range of 1000 mJ to 1100 mj/pulse.

The optical fiber 300 is disposed at an output end of the beam transmission unit and receives a laser beam.

Figure 3:
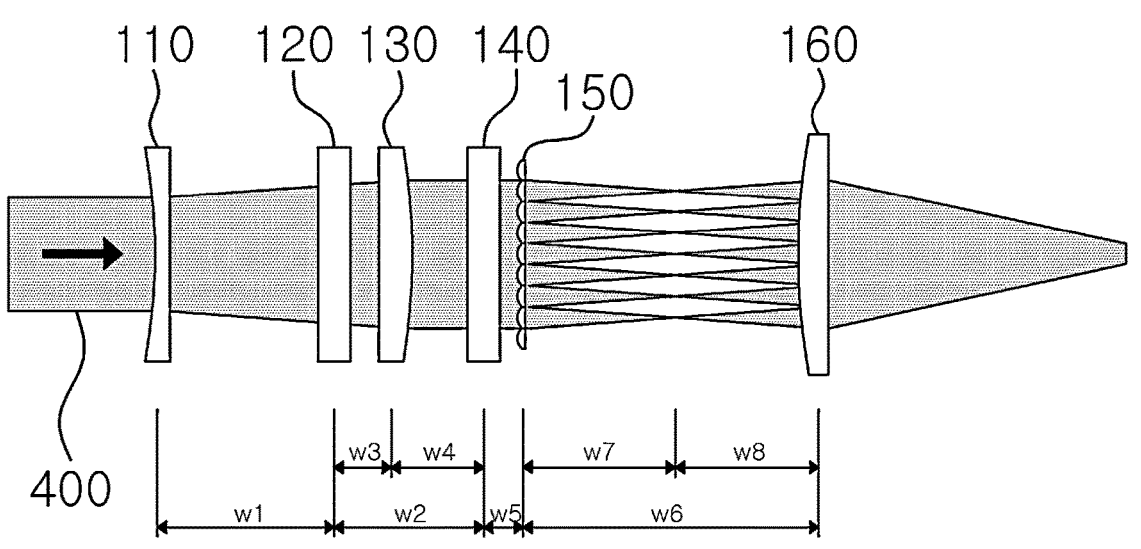
FIG. 3 is a configuration diagram of a beam transmission unit in the high-power laser beam transmitter according to an embodiment of the present disclosure.

FIG. 3 is a configuration diagram of a beam transmission unit in the high-power laser beam transmitter according to an embodiment of the present disclosure.

Referring to FIG. 3, the beam transmission unit 100 is composed of several lenses and several depolarizers respectively disposed between the several lenses. The several lenses are composed of a first lens 110, a second lens 130, a third lens 150, and a fourth lens 160.

A side receiving a laser beam of the first lens 110 is a concave surface and the other side thereof is flat surface, and a side receiving a laser beam of the second lens 130 is a flat surface and the other side thereof is a convex surface. The third lens 150 is composed of several lens cell arrays and is designed such that laser beams passing through the lenses, respectively, converge toward a focus surface and diffuse after passing through the focus surface. A side receiving a laser beam of the fourth lens 160 is a convex surface and the other surface thereof is a flat surface.

The several depolarizers may be composed of a first depolarizer 120 and a second depolarizer 140. However, the numbers of the several lenses and the several depolarizers are not limited. The first depolarizer is disposed between the first lens and the second lens and the second depolarizer is disposed between the second lens and the third lens.

The distance w1+w3 between the first lens 110 and the second lens 130 is determined in accordance with the lens magnification and the focal distance w7 of the third lens 150 is determined in accordance with the diameter of the optical fiber.

The distance w8 between the concentration position of the third lens and the fourth lens 160 should be at least 5 mm or more and maximally within the focal distance w7 of the third lens 150. The distance w6 between the third lens 150 and the fourth lens 160 is a minimum size that configures a beam homogenizer and the distance w1+w2 between the first lens 110 and the second depolarizer is a minimum size that configures a beam expander.

The distance w1 between the first lens 110 and the first depolarizer 120 is 1 mm or more, the distance w2 between the first depolarizer 120 and the second depolarizer 140 is within the range of 10 mm~100 mm, the distance w3 between the first depolarizer 120 and the second lens 130 is 1 mm or more, the distance w4 between the second lens 130 and the second depolarizer 140 is 1 mm or more, and the distance w5 between the second depolarizer 140 and the third lens 150 is within 1000 mm.

That is, the beam transmission unit 100 depolarizes a laser beam emitted from the high-power laser generator through the first depolarizer such that the depolarization state is not uniform, and secondarily depolarizes the laser beam through the second depolarizer, whereby it is possible to reduce an interference effect that is generated while a laser beam is transmitted.

Figure 4:
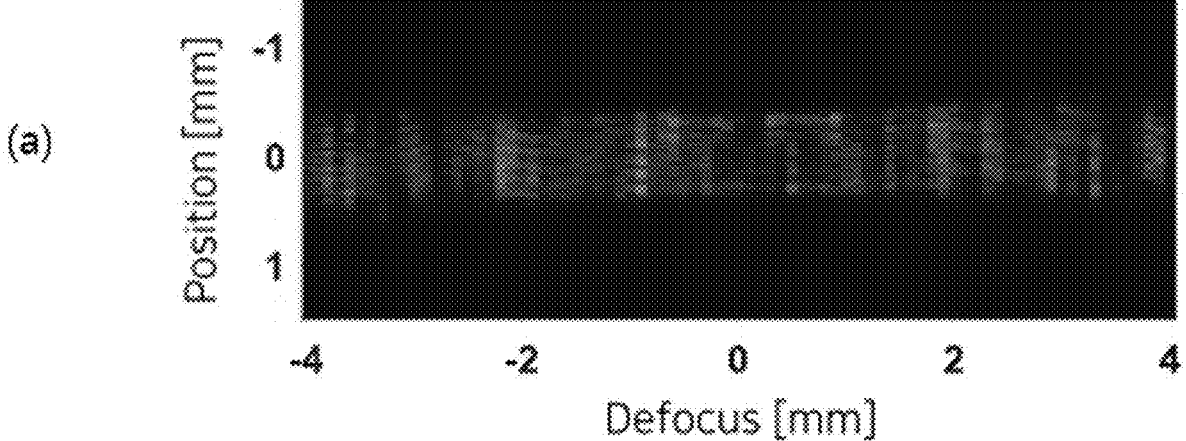
FIGS. 4 to 6 are exemplary views showing measurement for comparing a difference in instantaneous output depending on whether there is a depolarizer.
Figure 4:
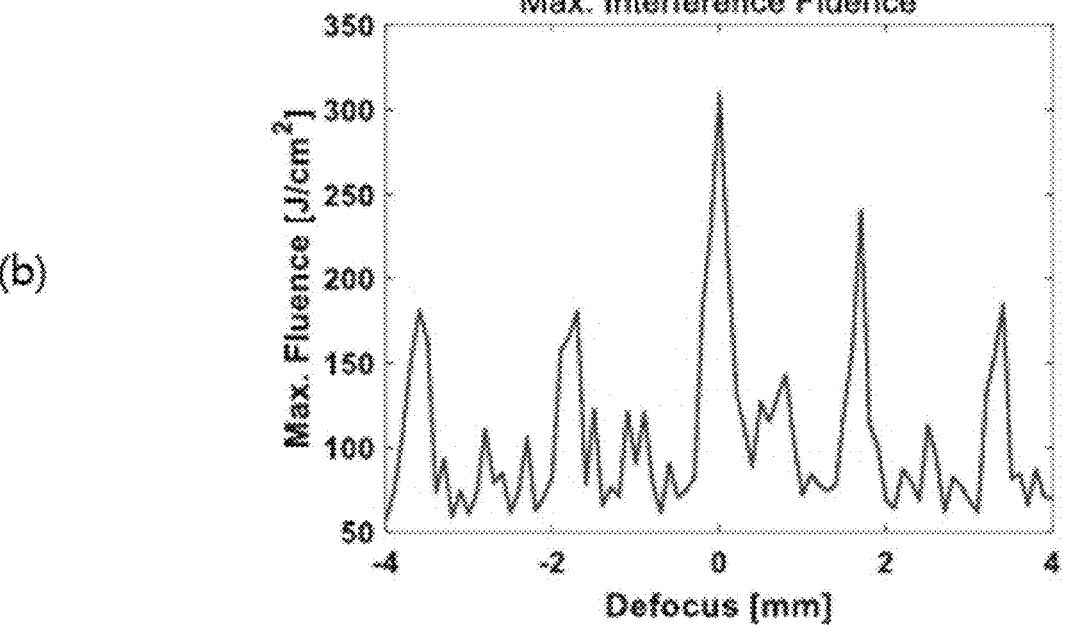
Figure 5:
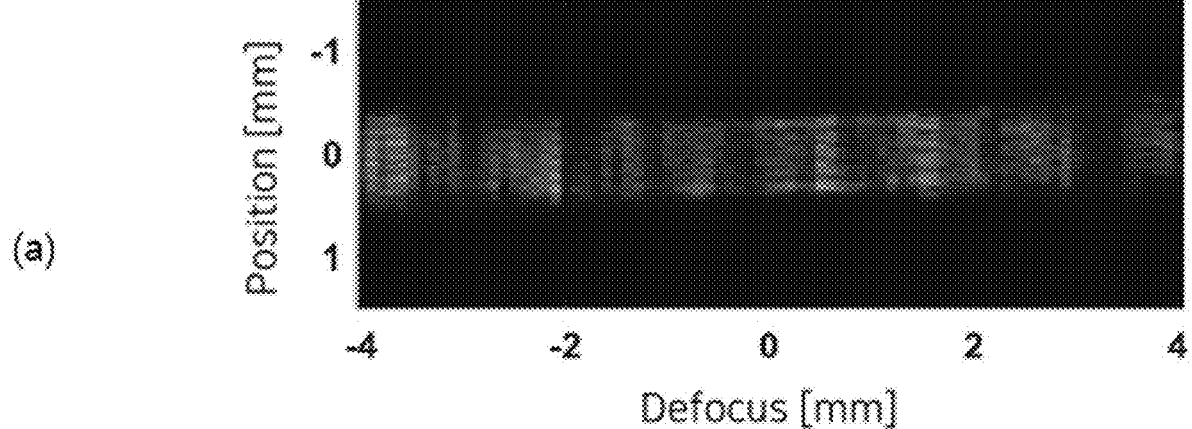
Figure 5:
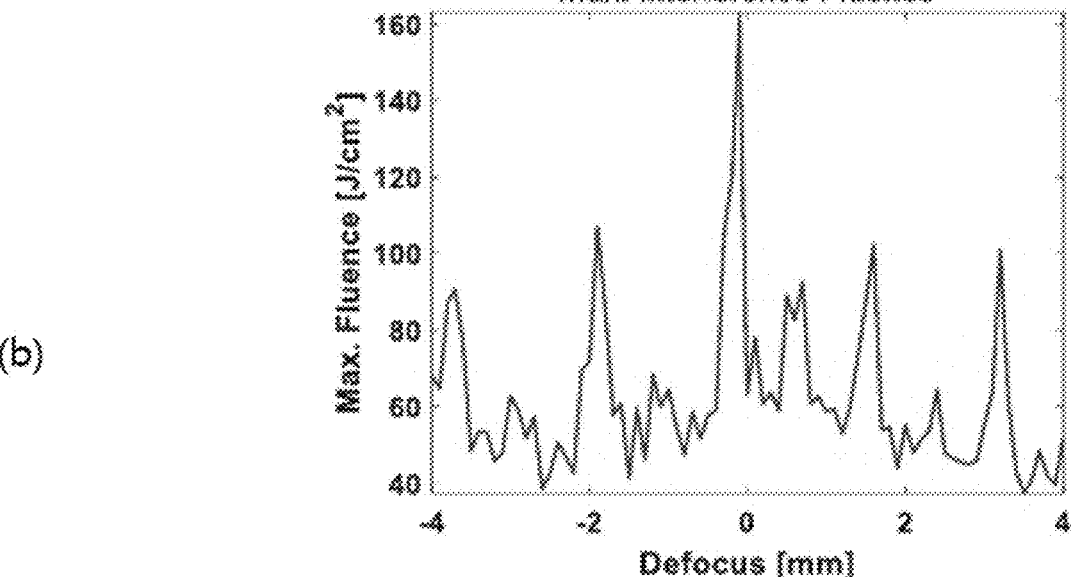
Figure 6:
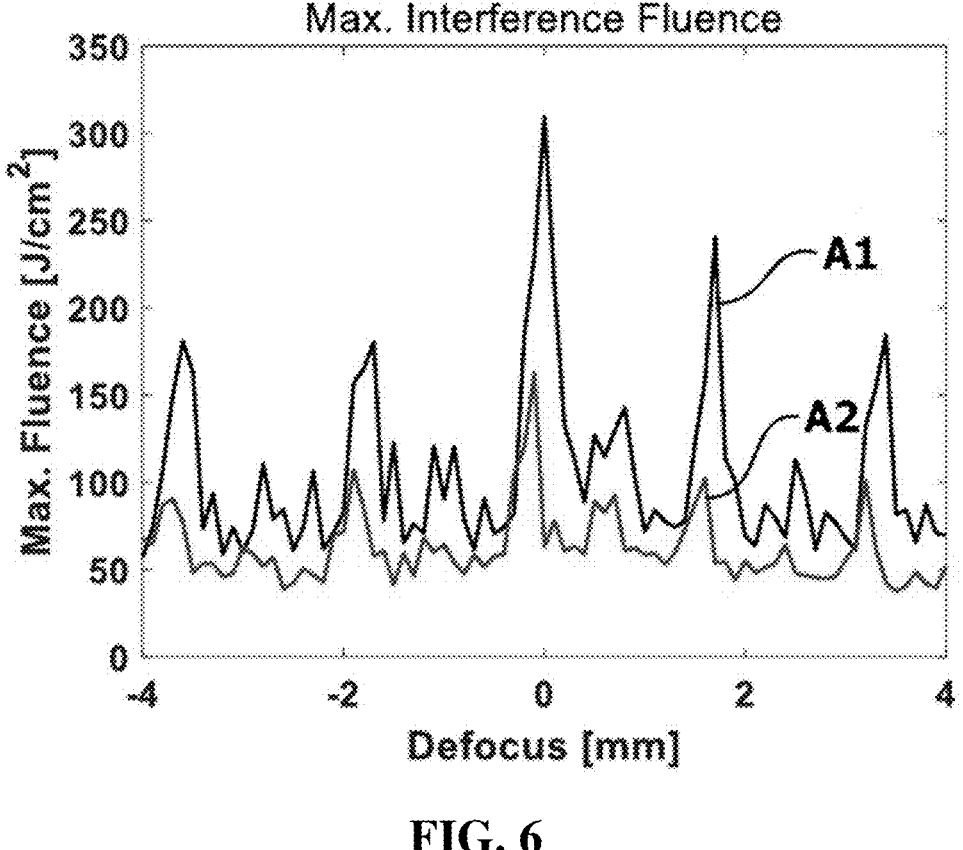

FIGS. 4 to 6 are exemplary views showing measurement for comparing a difference in instantaneous output depending on whether there is a depolarizer.

FIGS. 4 to 6 show experiment results when disposing a camera instead of the optical fiber of the present disclosure to measure maximum instantaneous output and extracting a brightness value of a point (pixel) having the largest value through the camera. Instantaneous output according to a defocus distance was measured while moving the camera along an optical axis. When a laser of 100 mJ per pulse was applied, FIG. 4 is an experiment result when a depolarizer was disposed and FIG. 5 is an experiment result when a depolarizer was not disposed.

Referring to FIG. 6, the instantaneous output peak when a depolarizer was disposed (A1) is about 300 J/cm² and the instantaneous output peak when a depolarizer was not disposed (A2) is about 150 J/cm². That is, it could be found that the instantaneous output peak when a depolarizer was disposed (A1) decreases to about a half the instantaneous output peak when a depolarizer was not disposed (A2). That is, it was experimentally found that constructive interference of a laser beam is attenuated by disposing a depolarizer and accordingly it is possible to reduce instantaneous output.

Figure 7:
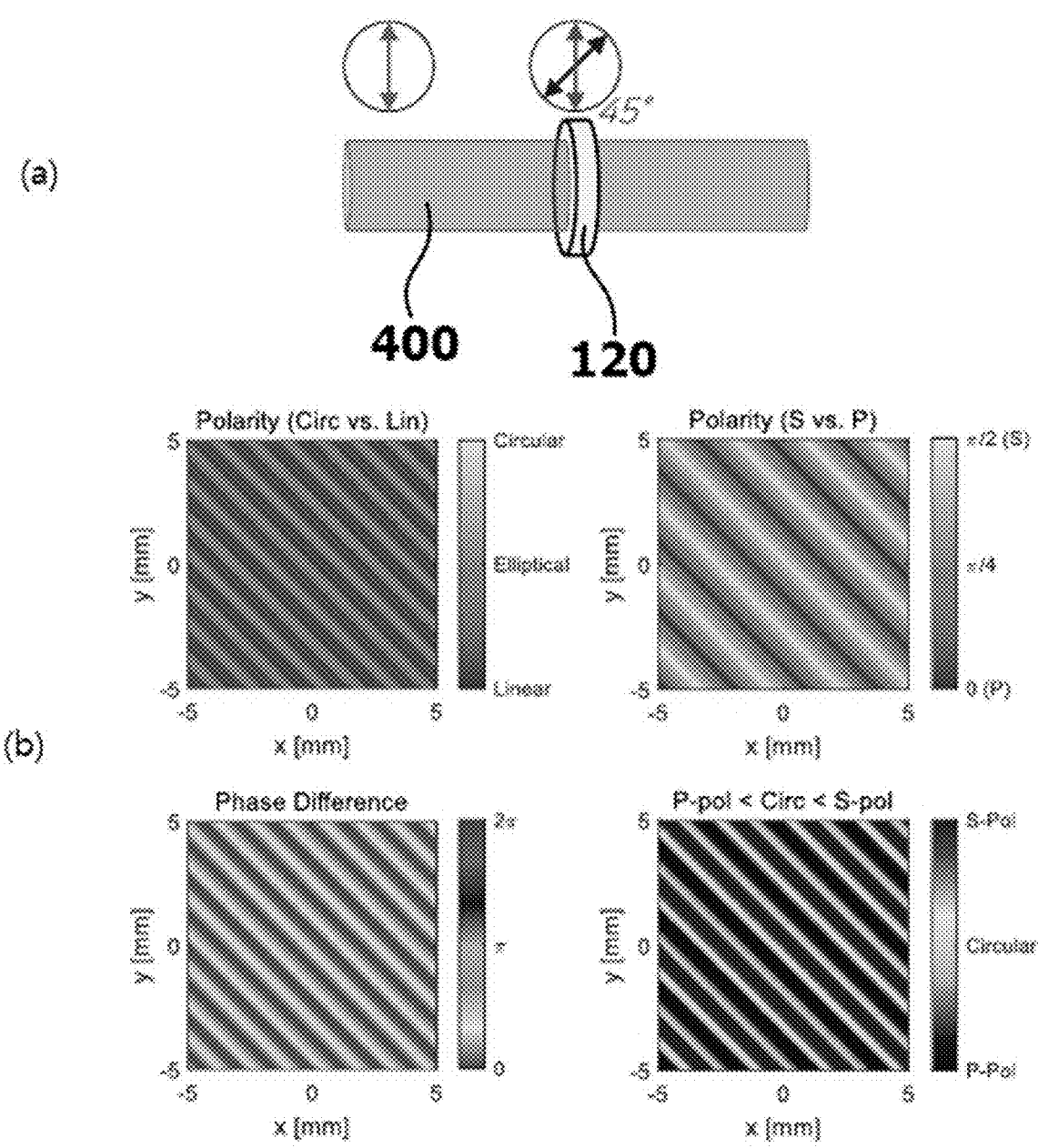
FIG. 7 is an exemplary view of an exit pattern accompanying S-pol incidence of a single depolarizer and FIG. 8 is an exemplary view of an exit pattern accompanying S-pol incidence of dual depolarizers.
Figure 8:
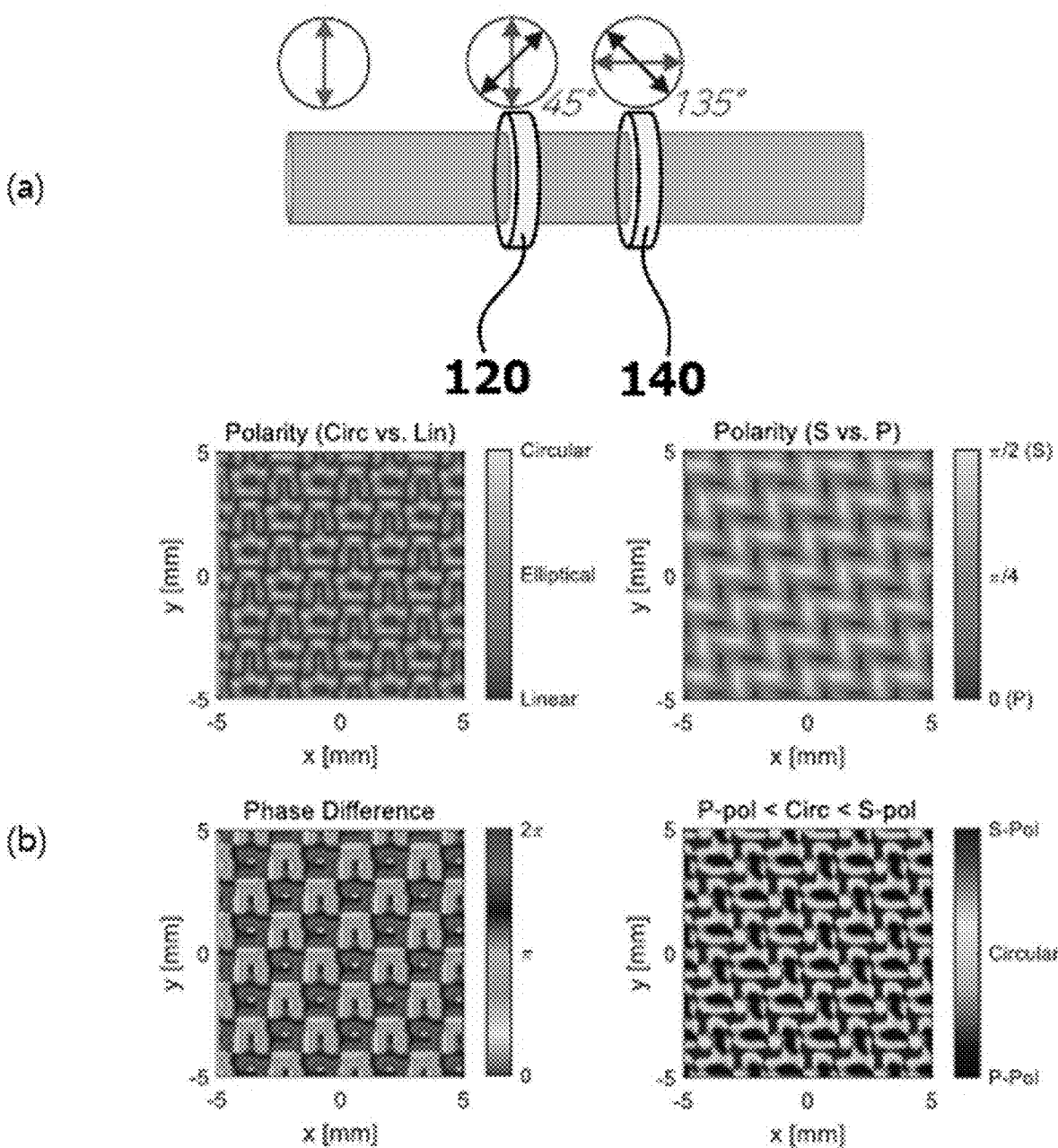

FIG. 7 is an exemplary view of an exit pattern accompanying S-pol incidence of a single depolarizer 120 and FIG. 8 is an exemplary view of an exit pattern accompanying S-pol incidence of dual depolarizers 120 and 140.

Referring to FIGS. 7 and 8, the depolarizers can have a regular pattern rather than a fully mixed pattern as pseudo random. It is possible to calculate an angle suitable for the number of depolarizers in order to achieve a non-uniform polarity pattern of the depolarizers.

Since a depolarizer by birefringence has a symmetric characteristic with respect to 180°, it is efficient to dispose depolarizers such that the angle differences are as large as possible when using several depolarizers. The polarity of incident light is not considered because it may depend on the situation of the surrounding and the kind of the light source, and the angle differences between depolarizers are defined as follows.

$$d_\psi = \frac{180°}{n}, \quad \psi_i = d_\psi \times (i-1)$$

where n is the number of depolarizers, $d\psi$ is the angle difference between depolarizers, and $\psi_i$ is the absolute angle of the i-th depolarizer.

Angle differences according to the number of depolarizers are as the following table.

TABLE 1

| n | dψ | ψ1 | ψ2 | ψ3 | ψ4 | ψ5 |
|---|-----|-----|------|------|------|------|
| 2 | 90° | 0°  | 90°  |      |      |      |
| 3 | 60° | 0°  | 60°  | 120° |      |      |
| 4 | 45° | 0°  | 45°  | 90°  | 135° |      |
| 5 | 36° | 0°  | 36°  | 72°  | 108° | 144° |

Although the present disclosure was described with reference to the exemplary embodiments illustrated in the drawings, those are only examples and may be changed and modified into other equivalent exemplary embodiments from the present disclosure by those skilled in the art. Therefore, the technical protective range of the present disclosure should be determined by the scope described in claims.

The invention claimed is:

1. A high-power laser beam transmitter including a depolarizer, comprising:

a high-power laser generator generating a high-power laser beam;

a beam transmission unit transmitting a laser beam emitted from the high-power laser generator to an optical fiber; and the optical fiber disposed at an output end of the beam transmission unit and receiving a laser beam, wherein the beam transmission unit is composed of a plurality of lenses and a plurality of depolarizers respectively disposed between the plurality of lenses, and wherein the plurality of lenses are composed of a first lens, a second lens, a third lens, and a fourth lens, and the plurality of depolarizers are composed of a first depolarizer and a second depolarizer, the first depolarizer is disposed between the first lens and the second lens, and the second depolarizer is disposed between the second lens and a third lens.

2. The high-power laser beam transmitter of claim 1, wherein the plurality of depolarizers have the same shape and the same width and height.

3. The high-power laser beam transmitter of claim 1, wherein a side receiving a laser beam of the first lens is a concave surface and the other side thereof is flat surface, a side receiving a laser beam of the second lens is a flat surface and the other side thereof is a convex surface, and the third lens is composed of a plurality of lens cell arrays.

4. The high-power laser beam transmitter of claim 1, wherein an angle difference of exit patterns of the plurality of depolarizers is generated in accordance with the number of the depolarizers that are disposed.

* * * * *